Sept. 21, 1965          C. ROMAY          3,206,790

LOCKING ASSEMBLY FOR A SWIVELED CASTER

Filed Dec. 12, 1963

INVENTOR.
CLETUS ROMAY
BY Cohn and Powell
ATTORNEY.

United States Patent Office 3,206,790
Patented Sept. 21, 1965

3,206,790
LOCKING ASSEMBLY FOR A SWIVELED CASTER
Cletus Romay, St. Louis, Mo., assignor to Welsh Co., St. Louis, Mo., a corporation of Missouri
Filed Dec. 12, 1963, Ser. No. 330,038
5 Claims. (Cl. 16—35)

The invention relates generally to improvements in a locking assembly for a swiveled caster, and more particularly to an improved caster swivel on a child stroller which can be selectively latched in a predetermined position.

A child stroller is usually constructed of a frame having a pair of rear ground wheels mounted on a transverse axle or axles, and having a pair of front ground wheels or casters swivelly mounted so that the stroller can be easily pushed, pulled or turned in any direction. Under some circumstances, it is desirable to fix the front ground casters so that they can not be swiveled, but are rather maintained and rotated in fixed planes. For example, when a stroller is used at a beach or other sandy area, the stroller can be pushed and guided much easier through the loose sand or turf if the front casters cannot swivel.

It is an important object of the present invention to provide a caster swivel mechanism in a device such as a stroller which can be selectively locked in a predetermined position for more convenient use of the stroller in sand or loose earth such as is encountered in and around the beach, and yet can be selectively unlocked for use under normal conditions on relatively hard ground or pavement where handling of the stroller is facilitated if the front ground casters swivel freely.

An important object is realized by the provision of a locking member that selectively engages a shoulder on the caster bracket swiveled to a frame whereby to hold the caster in a predetermined position relative to the frame.

Another important objective is achieved by the provision of means associated with the lock member for moving the lock member selectively out of engagement with the shoulder to release the caster for free swiveling movement.

Still another important object is afforded by the provision of a resilient means operatively connected to the locking member tending to urge the lock member toward the locking limit and tending to hold the locking member in locking engagement with the bracket shoulder. Other important advantages are obtained in that the resilient means snaps the lock member automatically into locking engagement with the shoulder as the caster is swiveled to the predetermined position.

An important object is realized in that the lock member consists of a plunger reciprocatively mounted on the frame and adapted selectively to interfit a bracket recess when the recess and plunger are aligned upon location of the caster in the predetermined position.

Another important objective is achieved in that the release mechanism consists of a cam plate having an elongate slot through which the plunger extends, the cam plate including a portion selectively movable against the plunger, upon relative movement of the plunger along the slot, to withdraw the plunger from the recess and hence release the caster.

Yet another important object is obtained by the structural arrangement that enables the cam plate to be effectively wedged between the frame and plunger head to retain the plunger in the retracted position out of the bracket recess so that the caster can swivel freely. The spring is associated to urge the plunger in a direction so that the cam plate is clamped under the spring loading between the plunger head and frame in the wedged position.

An important objective is to provide a locking assembly for a swiveled caster that is simple and durable in construction, economical to manufacture and assemble, highly efficient in operation, and which can be readily utilized by anyone with little or no instruction.

The foregoing and numerous other objects and advantages of the invention will more clearly appear from the following detailed description of a preferred embodiment, particularly when considered in connection with the accompanying drawings, in which.

Figure 4:
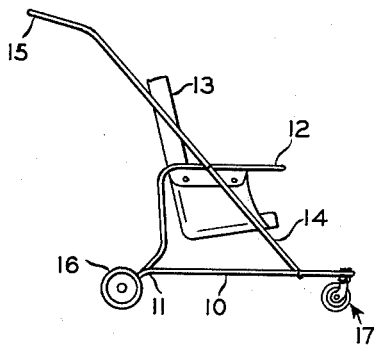
FIG. 4 is a side elevational view of a child's stroller to indicate the environment and utilization purpose of the invention.

Referring now by characters of reference to the drawings, and first to FIG. 4, it will be seen that the present invention is advantageously utilized in a child's stroller. As is usual, this stroller includes a substantially U-shaped base frame 10 disposed in a substantially horizontal plane. Extending upwardly from the free rear ends 11 of the base frame 10 is a seat frame 12. A seat structure 13 is carried by the seat frame 12. Pivotally connected to and extending between the base frame 10 and the seat frame 12 is a handle frame 14, the handle frame 14 extending rearwardly and upwardly to provide a hand grip 15 for the person utilizing and guiding the stroller.

A pair of rear ground wheels 16 are mounted on a transverse axle extending between the end 11 of the base frame 10. These ground wheels 16 usually rotate in fixed vertical and parallel planes extending fore and aft of the stroller. However, the front end of the stroller is usually supported by a pair of casters 17 swivelly mounted on opposite sides of the base frame 10. These casters 17 swivel or turn on vertical axes so that such casters 17 will align freely and easily in the direction of force applied to the stroller in moving the stroller in any direction.

Figure 2:
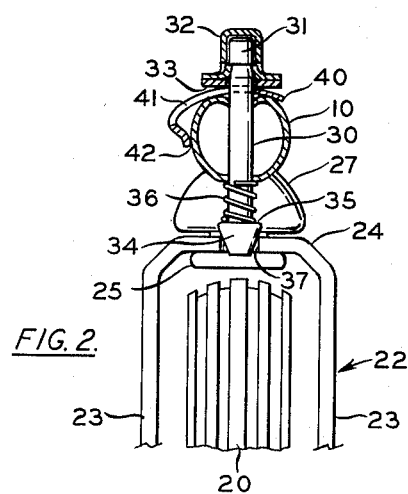
FIG. 2 is a fragmentary, enlarged cross-sectional view of the locking assembly as seen along line 2—2 of FIG. 1, illustrating the plunger in its locking limit.
Figure 3:
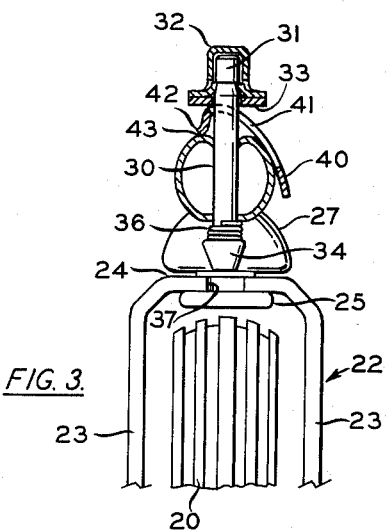
FIG. 3 is a cross-sectional view similar to FIG. 2 but illustrating the plunger in its fully retracted position.

The base frame 10 is of a tubular construction having a substantially circular cross-section as is best seen in FIGS. 2 and 3.

Figure 1:
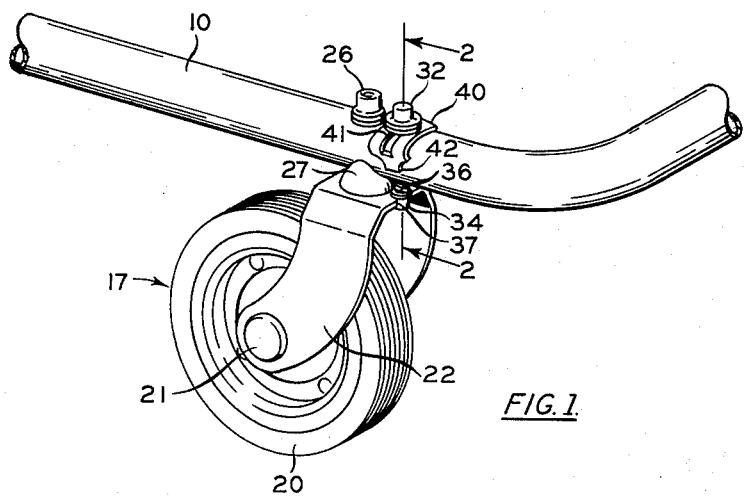
FIG. 1 is a perspective view of the swiveled caster and the cooperating locking assembly.

The casters 17 and the locking assembly utilized in cooperation with such casters 17 are best shown in detail in FIGS. 1-3.

For example, the casters 17 include a wheel 20 rotatively mounted by axle 21 to an inverted U-shaped bracket 22 or fork consisting of spaced side arms 23 interconnected by an integral top web 24. As is best seen in FIGS. 2 and 3, a pin 25 is secured to and extends upwardly through the bracket web 24, such pin 25 extending upwardly through the base frame 10. A cap 26 (FIG. 1) is secured to the upper end of pin 25 extending above and through the top of base frame 10, the cap 26 precluding withdrawal of the pin 25 from the frame 10 and maintaining assembly. A plastic bearing member 27 rotatively journals the caster pin 25, the bearing member 27 being located between the bottom of frame 10 and the top of the bracket web 24. It will be noted that the upper portion of the bearing member 27 is provided with an arcuate depression that conforms substantially to the curved configuration of the base frame 10 so as to hold the bearing member 27 in place. With this structural arrangement, the bracket 22 and the wheel 20 can swivel or turn freely about the vertical axis defined by the swivel pin 25.

The locking device includes a plunger 30 constituting a locking member which is reciprocatively mounted vertically in and through the base frame 10 immediately ahead of the swivel pin 25. The upper end 31 of plunger 30 extends upwardly above the top side of frame 10. A cap 32 is secured to the upper plunger end 31 and operates to limit the downward movement of the plunger 30. For reasons which will later appear, the underside of cap 32 is provided with a bearing surface 33.

The lower end 34 of plunger 30 extends through and below the bottom side of base frame 10, such lower plunger end 34 being provided with an enlarged formation or head having a downward taper and providing an upwardly facing abutment 35.

Located between the lower plunger head 34 and the underside of the base frame 10 is a compression spring 36, one end of spring 36 engaging the frame 10 and the other end engaging the plunger abutment 35. The compression spring 36 tends to urge the plunger 30 downwardly under spring loading to its fully extended position or to its locking limit illustrated in FIG. 2.

Cooperating with the plunger 30, and particularly with the lower plunger head 34 to afford a latch connection, the bracket web 24 is provided with a recess 37 that is alignable with and in the path of the plunger 30 when the bracket 22 and hence the caster wheel 20 are disposed in a predetermined position. The margin defining the substantially circular recess 37 constitutes a lock shoulder that is engageable by the lower plunger head 34 when such head 34 is received in the recess 37, the plunger 30 precluding any swiveling action of the caster 17.

The actuating means consists of a cam plate 40 of substantially an angular shape or substantially an inverted V-shape. One side portion of the V-shaped cam plate 40 is curved slightly to conform to the transverse arcuate configuration of the top surface of base frame 10 and to slidably engage such frame surface. The cam plate portion is provided with an elongate slot 41 that extends across the apex of the angle of the plate 40. The other side portion of the plate 40 includes a transverse edge 42 that slidably engages the base frame 10. Thus it is seen that the opposite side portions of the cam plate 40 engage the base frame 10 and hold the apex portion of such cam plate away from the frame 10. The curved configuration of the cam plate along the region of the slot 41 constitutes a camming portion.

The cam plate 40 is located between the top side of base frame 10 and the plunger cap 32, the plunger 30 extending through the slot 41. The bearing surface 33 engages the curved portion of the cam plate.

In one position of the cam plate, as illustrated in FIG. 3, the cam plate 40 holds the plunger 30 in its fully retracted position. The upper surface of the base frame 10 is provided with a depression about the plunger 30 to form a shoulder 43 that engages the transverse cam plate edge 42 and tends to hold the cam plate 40 in a wedged position between the plunger cap 32 and the frame 10. The spring 36 operates under the spring loading to hold the cam plate 40 tightly between the frame 10 and the plunger cap 32 and hence tends to maintain the cam plate 40 in the wedged position.

It is thought that the operation and functional advantages of the locking assembly have become fully apparent from the foregoing detailed description of parts, but for completeness of disclosure, the usage of the locking assembly and the results obtained will be briefly described.

First it will be assumed that the stroller will be used on relatively hard ground or pavement. Under these circumstances it is most desirable to have the casters 17 swivel freely. Accordingly, the cam plate 40 is slidably moved from the position illustrated in FIG. 2 to the position shown in FIG. 3 so that the plunger 30 is raised to a fully retracted position in which the lower plunger head 34 is completely removed or withdrawn from the bracket recess 37. During this movement of cam plate 40, the bearing surface 33 of the plunger cap 32 rides upwardly along the curved portion of the cam plate at one side of the angle until the cap 32 reaches the plate apex, the plunger 30 moving relatively along the slot 41. As stated previously, in this position, the transverse cam plate edge 42 engages the frame shoulder 43 and is accordingly wedged between the frame 10 and plunger cap 32. The spring 36 tends to hold the cam plate 40 in this wedged position by clamping the cam plate 40 firmly in place under spring loading. When the plunger 30 is fully retracted, as illustrated in FIG. 3, the casters 17 can pivot freely about the swivel axis provided by pin 25.

If the stroller is to be used on the beach or under such circumstances where sand or loose turf is encountered, the movement of the stroller can be more easily controlled if the front casters 17 were fixed in a predetermined position. To condition the stroller for this type of use, the cam plate 40 is moved from the wedged position illustrated in FIG. 3 to the inoperative position shown in FIG. 2 so as to allow the plunger 30 to lower under the loading of spring 36.

If the caster 17 is not located in the predetermined position in which bracket recess 37 is aligned with the plunger head 34, the spring 36 will urge the plunger head 34 against the top of the bracket web 24. As the bracket 22 is swiveled about pin 25, the lower plunger head 34 rides over and on the bracket web 24 until the caster 17 is moved to the predetermined position at which time the plunger head 34 is snapped automatically under spring loading into the bracket recess 37. The bracket 22 is precluded from any subsequent swiveling movement by the interfitting relationship of the lower plunger head 34 in the bracket recess 37. The spring 36 tends to hold the plunger head 34 in the bracket recess 37 and tends to preclude any accidental or unintentional withdrawal of the plunger 30.

Furthermore, the plunger cap 32 is urged against the top of the cam plate 40 under the spring loading, and thereby causes the cam plate 40 to be clamped between the cap 32 and frame 10 so that, there is a tendency to hold the cam plate 40 in the inoperative position shown in FIG. 2, thus providing another safeguard that tends to preclude accidental or unintentional withdrawal of the plunger head 34.

Of course, the caster 17 can be subsequently released in order to swivel freely by withdrawing the plunger 30 from the lock limit shown in FIG. 2 to the fully retracted limit shown in FIG. 3 by manipulation of the cam plate 40 as described previously.

Although the invention has been described by making detailed reference to a single preferred embodiment, such detail is to be understood in an instructive, rather than in any restrictive sense, many variants being possible within the scope of the claims hereunto appended.

I claim as my invention:
1. In a caster swivel locking assembly:
   (a) a frame of substantially curved configuration across the top,
   (b) a caster including a bracket swiveled to the frame,
   (c) the bracket being provided with a recess,
   (d) a plunger reciprocatively mounted in the frame and selectively movable to a locking limit in which the plunger interfits the recess and retains the bracket and caster in a predetermined position,
   (e) the plunger including a head at one side of the frame,
   (f) a spring operatively connected to the plunger and tending to urge the plunger toward the bracket and toward the locking limit, and
   (g) an angular cam plate disposed between the plunger head and frame top,
   (h) the cam plate including a first portion at one side of the angle that is curved to conform substantially to the curved configuration of the frame top and which slidably engages the frame, (i) the cam plate including a second portion at the other side of the angle engaging the frame, (j) the cam plate being provided with an elongate slot extending across the angle of the plate and receiving the plunger, (k) the cam plate selectively moving the plunger in a direction to withdraw the plunger from the bracket recess upon relative movement of the plunger along the plate slot, whereby to release the caster.

2. A caster swivel locking assembly as defined above in claim 1, in which:

(1) the frame having a shoulder in the path of and engageable with the second plate portion to wedge the cam plate between the plunger head and frame, and hence retain the plunger in the fully retracted position.

3. In a caster swivel locking assembly:

(a) a frame, (b) a caster including a bracket swiveled to the frame, the bracket being provided with a recess, (c) a plunger reciprocatively mounted in the frame and selectively movable to a locking limit in which the plunger interfits the recess and retains the bracket and caster in a predetermined position, (d) a spring operatively connected to the plunger and tending to urge the plunger toward the bracket and toward the locking limit, and (e) an angular cam plate disposed between the plunger and the frame, (f) the cam plate including a first portion at one side of the angle which slidably engages the frame, (g) the cam plate including a second portion at the other side of the angle engaging the frame and wedging selectively between the plunger and the frame, (h) the cam plate being provided with an elongate slot receiving the plunger, (i) the cam plate selectively moving the plunger in a direction to withdraw the plunger from the bracket recess upon relative movement of the plunger along the plate slot, whereby to release the caster, and (j) the second portion of the cam plate wedging between the plunger and frame to retain the plunger in a fully retracted position.

4. In a caster swivel locking assembly:

(a) a frame, (b) a caster including a bracket swiveled to the frame, the bracket being provided with a recess, (c) a plunger reciprocatively mounted in the frame and selectively movable to a locking limit in which the plunger interfits the recess and retains the bracket and the caster in a predetermined position, (d) a spring operatively connected to the plunger and tending to urge the plunger toward the bracket and toward the locking limit, and (e) an angular cam plate disposed between the plunger and frame, (f) the cam plate including a first portion at one side of the angle that conforms substantially to the configuration of the frame across the frame top and which slidably engages the frame, (g) the cam plate including a second portion at the other side of the angle engaging the frame, (h) the cam plate being provided with an elongate slot receiving the plunger, and (i) the cam plate selectively moving the plunger in a direction to withdraw the plunger from the bracket recess upon relative movement of the plunger along the plate slot, whereby to release the caster.

5. In a caster swivel locking assembly:

(a) a frame of substantially curved configuration across the top, (b) a caster including a bracket swiveled to the frame, the bracket being provided with a recess, (c) a plunger reciprocatively mounted in the frame and selectively movable to a locking limit in which the plunger interfits the recess and retains the bracket and caster in a predetermined position, the plunger including a head at one side of the frame, (d) a spring operatively connected to the plunger and tending to urge the plunger toward the bracket and toward the locking limit, and (e) an angular cam plate disposed between the plunger head and frame top, (f) the cam plate including a first portion at one side of the angle that is curved to conform substantially to the curved configuration of the frame top and which slidably engages the frame, (g) the cam plate including a second portion at the other side of the angle engaging the frame, (h) the cam plate being provided with an elongate slot receiving the plunger, and (i) the cam plate selectively moving the plunger in a direction to withdraw the plunger from the bracket recess upon relative movement of the plunger along the plate slot, whereby to release the caster.

References Cited by the Examiner

UNITED STATES PATENTS

| 1,354,222 | 9/20 | Sibley | 24—126 |
| 1,599,485 | 9/26 | Perin. | |
| 1,662,292 | 3/28 | Bender | 280—47.38 X |
| 2,369,453 | 2/45 | Goldfield et al. | 16—35 X |
| 2,544,924 | 3/51 | Herold | 16—35 X |
| 2,799,514 | 7/57 | Kramcsak | 16—35 X |
| 2,967,591 | 1/61 | Blount | 16—35 X |

A. HARRY LEVY, *Primary Examiner.*

KENNETH H. BETTS, *Examiner.*